United States Patent
Claussen et al.

(10) Patent No.: US 10,240,497 B2
(45) Date of Patent: Mar. 26, 2019

(54) PROCESS AND APPARATUS FOR THE PREPARATION OF A CYLINDER OIL

(71) Applicant: LUKOIL MARINE LUBRICANTS GERMANY GMBH, Hamburg (DE)

(72) Inventors: Stefan Claussen, Hamburg (DE); Jan Thiedeitz, Norderstedt (DE)

(73) Assignee: LUKOIL MARINE LUBRICANTS GERMANY GMBH, Hamburg (DE)

( * ) Notice: Subject to any disclaimer, the term of this patent is extended or adjusted under 35 U.S.C. 154(b) by 0 days.

(21) Appl. No.: 14/768,333

(22) PCT Filed: Feb. 18, 2014

(86) PCT No.: PCT/EP2014/053132
§ 371 (c)(1),
(2) Date: Aug. 17, 2015

(87) PCT Pub. No.: WO2014/128122
PCT Pub. Date: Aug. 28, 2014

(65) Prior Publication Data
US 2015/0377099 A1 Dec. 31, 2015

(30) Foreign Application Priority Data
Feb. 19, 2013 (EP) .................................... 13155770

(51) Int. Cl.
*F01M 9/02* (2006.01)
*C10M 175/00* (2006.01)
(Continued)

(52) U.S. Cl.
CPC ............ *F01M 9/02* (2013.01); *C10M 109/00* (2013.01); *C10M 175/0091* (2013.01);
(Continued)

(58) Field of Classification Search
CPC . F01M 9/02; C10M 109/00; C10M 175/0091; C10N 2230/02
See application file for complete search history.

(56) References Cited

U.S. PATENT DOCUMENTS

| 5,067,455 A | 11/1991 | Okajima et al. |
| 6,845,745 B2 | 1/2005 | Carey et al. |

(Continued)

FOREIGN PATENT DOCUMENTS

| CN | 101048484 A | 10/2007 |
| EP | 1640441 A1 | 3/2006 |

(Continued)

OTHER PUBLICATIONS

Communication under Rule 71(3) with Intention to Grant, Application No. 13155770.4, dated Nov. 25, 2015, 31 pages.
(Continued)

*Primary Examiner* — Kevin A Lathers
(74) *Attorney, Agent, or Firm* — Porter Wright Morris & Arthur LLP

(57) ABSTRACT

A process for production of cylinder oil comprises providing used oil, providing fresh cylinder oil, and blending the used oil with the fresh cylinder oil. The used oil has a lower TBN value than the fresh cylinder oil. A process for the operation of an internal combustion engine comprises preparing cylinder oil as described and using the cylinder oil in the internal combustion engine. An apparatus for the preparation of a cylinder oil comprises a blending means for blending used oil and fresh cylinder oil. The blending means is in flow communication with at least one compartment of an internal combustion engine that comprises used oil or at least one storage compartment comprising used oil, at least one storage compartment for fresh cylinder oil, and at least one
(Continued)

cylinder of an internal combustion engine. Used oil and fresh cylinder oil are used for the preparation of cylinder oil.

20 Claims, 3 Drawing Sheets

(51) Int. Cl.
  *C10M 177/00* (2006.01)
  *C10M 109/00* (2006.01)
  *F01M 11/04* (2006.01)
(52) U.S. Cl.
  CPC ....... *C10M 177/00* (2013.01); *C10N 2230/02* (2013.01); *C10N 2230/52* (2013.01); *C10N 2240/102* (2013.01); *F01M 2011/0466* (2013.01); *F16N 2200/08* (2013.01)

(56) References Cited

U.S. PATENT DOCUMENTS

| | | | |
|---|---|---|---|
| 7,316,992 | B2 | 1/2008 | Natoli et al. |
| 8,147,124 | B1 | 4/2012 | Glanville |
| 2004/0144355 | A1 | 7/2004 | Carey et al. |
| 2008/0153726 | A1* | 6/2008 | Damm ............... C10L 1/02 508/391 |
| 2008/0287327 | A1* | 11/2008 | Mayhew ............ C10M 163/00 508/186 |

FOREIGN PATENT DOCUMENTS

| | | | |
|---|---|---|---|
| EP | 1640442 | A1 | 3/2006 |
| EP | 2497817 | A1 | 9/2012 |
| EP | 2767578 | B1 | 8/2014 |
| GB | 1183345 | A | 3/1970 |
| JP | 60-147519 | A | 8/1985 |
| JP | 2-99708 | A | 4/1990 |
| JP | 7-54627 | A | 2/1995 |
| RU | 2345127 | C1 | 1/2009 |
| RU | 2371591 | C2 | 10/2009 |
| SG | 130805 | A | 4/2007 |
| WO | 03/072911 | A1 | 9/2003 |
| WO | 2006/014866 | A1 | 2/2006 |
| WO | 2006/032271 | A1 | 3/2006 |
| WO | 2006/066571 | A1 | 6/2006 |
| WO | 2006/069572 | A1 | 7/2006 |
| WO | 2007/044909 | A1 | 4/2007 |
| WO | 2007/057007 | A1 | 5/2007 |
| WO | 2008/073405 | A1 | 6/2008 |
| WO | 2011/034537 | A1 | 3/2011 |
| WO | 2011/042412 | A1 | 4/2011 |
| WO | WO 2011/042412 | A1 * | 4/2011 |

OTHER PUBLICATIONS

Communication pursuant to Article 94(3) EPC, Application No. 13155770.4, dated Feb. 13, 2014, 6 pages.
European Search Report, Application No. 13155770.4, dated May 7, 2013, 6 pages.
http://MERRIAM-WEBSTER.com/dictionary/cylinderoil, Cylinder Oil Definition dated Nov. 6, 2013.
Ron Jukes, Ph.D., Chevron Oronite, letter dated Aug. 9, 2013.
Wartsila low-speed engines, Data & Specifications, Lubricating Oils, Issue 1, p. 1-3 (Oct. 16, 2012).
Maersk Fluid Technology, SEA-Mate Bleinding-on-Board, Superior quality, on-board cylinder oil blending and fit-for-purpose lubrication, p. 1-2.
Merriam Webster, http://www.merriam-webster.com/dictionary/cylinderoil (Jun. 11, 2013).
Declaration by Ron Jukes, Ph.D. (Aug. 9, 2013).
Man B&W Diesel, Man B&W moves towards Intelligent Cylinder Lubrication (Apr. 2, 2002).
Man Diesel Sea-Mate, Onboard Blending and Fluid Analysis Systems (May 2009).
Sea-Mate Blending-On-Board, Superior quality. Onboard blending. Fit-for-purpose efficiency., The lubrication system that cleans teh engine and protects the environment., Maersk Fluid Technology (May 16, 2012).
Waybackmachine, http://maerskfluid.com/mxcms.aspx?itemId=16 (Oct. 6, 2012), with file properties.
Opposition to EP 2767578 dated Nov. 3, 2016.
Keith P. Saddler, Blending Cylinder Oil Onboard to Reduce Operational Costs and Particulate Emissions through the Use of SEA-Mate Technology (2009).
Cambridge Dictionary, dictionary.cambridge.org/dictionary/english/alkai@a=british (undated).
Affidavit of Mr. Jens Byrgesen t(Feb. 11, 2016).
Affidavit of Mr. Mark Wells (Oct. 31, 2016).
Second Affidavit of Mr. Mark Wells (Oct. 31, 2016).
Affidavit of Mr. Henrik Bak Weimar (Nov. 3, 2016).
Mark Wells et al., Minutes APM-M BP Marine meeting Aug. 24, 2012. with file properties.
Mark Wells et al., APM-M—BP Marine meeting Aug. 24, 2012, public version.
Maersk Fluid Technology, No Objection Letter for 90-100BN cylinder oil: ExxonMobil Mobilgard 300 (system oil) and blending on board additive packages from ExxonMobil, BP and PetroChina (Oct. 26, 2010).
Viktor Zhuravskiy, E-mail communication between MFT and Lukoil, Subject: 100BN (Jan. 30, 2013).
K.W. Damm et al., A.P. Moller—Maersk/ExxonMobil Meeting, 2006 Strategy Session (Jan. 26, 2006).
Material Safety Data Sheet, ExxonMobil Lubricants & Specialties Europe, Base Oil and Additives (Jan. 11, 2006).
Maersk Fluid Technology, Inc., Letter of No Objection for Mobilgard 300/Peco, BH60 and BN70 blend (Jun. 16, 2009).
English translation of Decision to Grant dated Nov. 2, 2017, including Search Report, from corresponding RU 2015134221/06.
E-mail communication chain from Victor Zhurayskiy, Mar. 4, 2013, to Soren Pietzcker, Feb. 2, 2017, pp. 1-4.
Confidentiality Agreement, between LUKOIL Marine Lubricants LTD and A.P. Møller-Mærsk A/S, pp. 1-6 (Dec. 14, 2013).
Affidavit of Mr. Stephen Claußen, pp. 1-3 (Jun. 3, 2017).
Affidavit of Mr. Jan Thiedeitz, pp. 1-2 (Jun. 6, 2017).
Affidavit of Mr. Viktor Zhuravsky, pp. 1-2 (Jun. 4, 2017).
Cyprus Meeting Notes, pp. 1 (Dec. 7, 2012).
Wärtsilä Technical Journal, In Detail, pp. 1-68, Issue No. 01 (2012).
Wärtsilä Technical Journal Cover, In Detail, pp. 1-2, Issue No. 01, WaybackMachine Screenshot (Sep. 7, 2012).
Sea-Mate Blending-On-Board, Case study: Variable Base No. (BN) Cylinder Oil Blended cylinder oil laboratory evaluation, Maersk Group, pp. 1-8, www.maerskfluid.com (undated).
Mortier, R. M. et al., Chemistry and Technology of Lubricants, Blackie Academic & Professional, 2nd Edition, pp. 235-238 (1992).
Jacobsen, Dorthe, Recommendation for Cylinder Lubrication Oil in MAN B&W Two Stroke Diesel Engines, MAN Diesel & Turbo, pp. 1-4 (Oct. 29, 2012).
CIMAC, Guidelines for the Lubrication of Two-Stroke Crosshead Diesel Engines, No. 15, pp. 1-67 (1997).
Declaration of Koki Kawamorita dated Aug. 9, 2018 and Certified English Translation of previously cited JPH 02-99708.
Declaration of Shamba Jumaine, pp. 1-4 (Jul. 6, 2018).
Declaration of Shamba Jumaine, Annex 1, Technical Data Sheet, RB Products, Inc., pp. 1-2 (undated).
Declaration of Shamba Jumaine, Annex 2, Safety Data Sheet, RB Products, Inc., pp. 1-8 (Aug. 23, 2016).
Declaration of Shamba Jumaine, Annex 3, Environmental risk evaluation report: para-C12-alkylphenols (dodecylphenol and tetrapropenylphenol), Environment Agency, pp. 1-114 (May 2007).
Declaration of Shamba Jumaine, Annex 4, An Internationally Recognized Nomenclature System for Petroleum Additives, ATC Document 31, pp. 1-10 (Jul. 6, 2007).

\* cited by examiner

PROCESS AND APPARATUS FOR THE PREPARATION OF A CYLINDER OIL

INTRODUCTION

The present invention concerns a process for the production of a cylinder oil comprising the steps:
providing a used oil,
providing a fresh cylinder oil, and
blending the used oil with the fresh cylinder oil,
wherein the used oil has a lower TBN value than the fresh cylinder oil.

The invention further concerns a process for the operation of an internal combustion engine comprising the steps of:
preparing a cylinder oil according to a process for the production of a cylinder oil as described herein, and
using the cylinder oil in the internal combustion engine.

Also part of the present invention is an apparatus for the preparation of a cylinder oil, comprising a blending means for blending used oil and fresh cylinder oil, characterized in that the blending means is in flow communication with
at least one compartment of an internal combustion engine that comprises used oil or at least one storage compartment comprising used oil,
at least one storage compartment for fresh cylinder oil, and
at least one cylinder of an internal combustion engine.

A further aspect of the present invention is the use of used oil and fresh cylinder oil for the preparation of cylinder oil.

The processes, apparatus and uses of the present invention are especially provided for the use with two-stroke crosshead engines installed on a ship and/or for four-stroke auxiliary engines installed on a ship.

PRIOR ART

Cylinder oil is an oil usually used for the lubrication of cylinders in an internal combustion engine. It has various functions. Its main function is to provide lubrication between the cylinder and/or the piston ring and cylinder liner. Its purpose is therefore wear control. A further important function is to prevent corrosion of the material of the cylinder and the material of the liner or walls of the combustion chamber. The cylinder oil itself should be stable against thermal decomposition and it should have good antioxidant performance, good antifoam performance and good water demulsability. Pressure performance is also important for cylinder oils.

Most of these properties of cylinder oils are controlled by additives. The kinematic viscosity is mainly controlled by the components of the oil itself. Hydrocarbons with long carbon chains and hydrocarbons with branched carbon chains tend to have higher kinematic viscosities. Corrosion prevention properties are induced into cylinder oils mainly by addition of basic organic compounds, such as amines or the like. Organic di-imines as described in GB 1,183,345 A are predominantly used in cylinder oils as additive to control the corrosion prevention properties. The basic additive neutralizes acids, e.g. sulfuric acid and other acids, that are formed during combustion in the combustion chamber from sulfur or sulfur containing compounds comprised in the fuel. Cylinder oil may comprise 0.1% to 30% by weight of these diimines. A further example for suitable anti-wear and anti-corrosion performance enhancing additives are alkylamine-alkylphosphates as disclosed in US 2004/144355 A.

For some lubricant applications such as in lubricating cylinders in crosshead diesel engines that employ all-loss lubrication systems and combust heavy fuel oil with widely varying sulfur contents, the engine lubrication requirements vary to such a large degree and with sufficient frequency that one lubricant formulation may not provide adequate performance over the full range of operating conditions. This inability can result in at least increased engine maintenance needs and more typically unnecessary expense as a result of repair costs, down time and excessive oil usage. Thus, there is a need for being able to vary the composition of a lubricant in response to an engine's actual lubrication requirements. US 2004/144355 A suggests a system in which additives are added to a primary lubricant in order to adapt the anti-corrosion properties to the fuel and the engine conditions. The use of used oil is not disclosed.

Cylinders usually have a larger amount of wear than other parts of the engine, have a higher temperature and the combustion process applies further harsh conditions on cylinder oil. Cylinder oil is therefore usually much more contaminated than oil in the rest of the engine (so-called system oil). In engines where the system oil is one and the same with cylinder oil or is in contact with the cylinder oil, the cylinders introduce the major amount of pollutants into the system oil. In large engines that can use several tens of thousands of liters of system oil, cylinder oil and system oil are therefore often separated in order to protect the system oil from pollution. In such system, the cylinder oil cannot be regenerated by mixing with the system oil. Its quality therefore deteriorates fast. In order to maintain a sufficient quality of the cylinder oil, it has to be exchanged often or it is used only in a once through operation in a so-called "all-loss" lubricating system. In all-loss systems, cost for system oil is reduced but costs for cylinder oil is still high. EP 1 640 442 B1 proposes a system where spend system oil of an engine is mixed with additives to produce cylinder oil. Such a system uses used oil to produce cylinder oil and therefore reduces costs and environmental concerns. While this system in general provides sufficient control of the corrosion properties of the produced cylinder oil and makes the use of usual cylinder oil redundant, it also has disadvantages. The cylinder oil produced by this method has a much lower kinematic viscosity and therefore inferior lubrication properties than usual cylinder oil. Hence, it has to be used in larger amount to provide the same lubrication properties. Thereby the effect of reduction of the oil consumption is diminished.

In addition, the additives used have a very high kinematic viscosity, often near 100 mm$^2$/s at 100° C. or above. Such liquids can only be moved by pumps if the liquids are kept warm. Therefore, tanks, pipes, blender and other equipment in contact with the additives need to be equipped with heaters. In cold climate, also tankers and the like that carry the additives to the ships or other installations in contact with the additives need to be equipped with heater or need to be well isolated. Therefore logistic is a major problem when using such additives for the on-site manufacture of cylinder oil. Beyond the logistics there is always the risk that local overheating that can easily occur and contributes to oxidation of the additives and will reduce significantly the quality of the additives and hence has an impact on the quality of the cylinder oil produced.

Problems to be Solved

It is the objective of this invention to provide a system that reduces the amount of lubricants used in internal combustion engines, especially the amount of cylinder oil and/or system oil. At the same time, the present invention aims to provide a process and an apparatus that provides better control of the kinematic viscosity when producing cylinder oil from used oils. Improvement of wear and corrosion is a further objective of the present invention.

DESCRIPTION OF THE PRESENT INVENTION

The present invention concerns a process for the production of a cylinder oil comprising the steps:
providing a used oil,
providing a fresh cylinder oil, and
blending the used oil with the fresh cylinder oil,
wherein the used oil has a lower TBN value than the fresh cylinder oil.

This process allows the reuse of used oil as cylinder oil and therefore reduces cost and alleviates environmental concerns. It also provides at the same time partially recycled cylinder oil with a higher kinematic viscosity than the processes described in the prior art, i.e. a kinematic viscosity that is closer to the kinematic viscosity of usual cylinder oil. That blending of used oil and cylinder oil has such advantageous effects is surprising, especially for the blending of system oil and cylinder oil, because the usual purpose of a cylinder oil can only be obtained if system oil and cylinder oil are separated. It has therefore never been contemplated to blend these oils to produce a cylinder oil prior to the invention.

According to the present invention cylinder oil is oil that is designed for the use in the lubrication of a cylinder in an internal combustion engine. It preferably comprises basic, i.e. alkaline, additives. Preferably, the cylinder oil produced by the present invention is an oil designed for the use as an all-loss oil. It is also preferred that the cylinder oil is designed for the use in crosshead diesel engines and especially in two-stroke crosshead diesel engines, especially those installed on marine vessels, such as ships. The engines may, however, also be installed in a stationary system. Alternatively, it is preferred that the cylinder oil is designed for the use in in four stroke diesel engines with or without crosshead, especially those installed on marine vessels, such as ships. Such engines could for example be auxiliary engines on board of a ship for producing energy in conjunction with a generator or the like.

It is further preferred that the used oil comprises at least in part used system oil from at least one crosshead diesel engine that employs an all-loss lubrication system for the cylinders. It is, however, most preferred that the internal combustion engine is installed on a ship and that the process is performed on a ship. It is further preferred that the engine is a crosshead diesel engine that employs an all-loss lubrication system for the cylinders.

In the context of the present invention the wording "fresh cylinder oil" denotes a cylinder oil that has no content of unprocessed used oil. It may, however, contain recycled oil that has been processed in a factory, i.e. recycling oil. Examples are usual commercially available cylinder oils. Preferably, the cylinder oils used in this invention have a high TBN value and a high viscosity. Especially useful is NAVIGO 100 MCL™ with a kinematic viscosity of 20 mm$^2$/s at 100° C. and a TBN value of 100 (available from LUKOIL Marine Lubricants Ltd., Hamburg, Germany), which is the only commercially available cylinder oil with a TBN value of 100 or above.

In the context of the present invention, the wording "used oil" denotes an oil that has been used for lubrication of any kind or for other purposes or comprises such oil. It may have been used as such or it may contain oils that have been used. Especially preferred is the use of waste oil that is otherwise disposed of.

One factor to be considered for the lubrication properties of cylinder oil is the kinematic viscosity. If the kinematic viscosity of the cylinder oil is too low, the oil film on the cylinder liner may not be continuous and the cylinder or the piston ring may come in direct contact with the cylinder liner leading to increased wear. A further important factor for avoiding corrosive wear is the alkalinity reserve in the oil film left on the cylinder surface. When the piston moves down the cylinder surface is exposed to the aggressive atmosphere that causes the corrosive wear. The oil film thickness left on the cylinder surface depends on the kinematic viscosity of the cylinder oil. The thinner the cylinder oil the lower the oil film thickness and the alkalinity reserve of the oil film covering the cylinder surface, as less oil comprises less basic compounds per surface area, leading to higher level of corrosive wear. If the kinematic viscosity is too high, friction is too high, leading to loss of performance of the engine and in combination with a surplus in the alkalinity reserve it can form additional deposits on the upper piston land and on the back of the piston ring leading to higher wear levels or scuffing.

For the purposes of the present invention all values of the kinematic viscosity are measured according to DIN 51562/2. Accordingly, all values of kinematic viscosity stated herein are kinematic viscosities at 100° C. as described in DIN 51562/2.

The cylinder oil of the present invention preferably has a kinematic viscosity of 14 mm$^2$/s or more at 100° C., more preferably of 15 mm$^2$/s or more at 100° C., even more preferably of 16 mm$^2$/s or more at 100° C. and most preferably of 17 mm$^2$/s or more at 100° C. The fresh cylinder oil of the present invention preferably has a kinematic viscosity of 16 mm$^2$/s or more at 100° C., preferably 18 mm$^2$/s or more at 100° C. and most preferably of 19 mm$^2$/s or more at 100° C. The kinematic viscosity of the fresh cylinder oil is preferably in a range of from 16 to 24 mm$^2$/s at 100° C., more preferably in a range of from 18 to 22 mm$^2$/s at 100° C. and most preferably in a range of from 19 to 21 mm$^2$/s at 100° C. The used oil of the process of the present invention may have a kinematic viscosity of up to 25 mm$^2$/s. The used oil of the process of the present invention preferably has a kinematic viscosity in the range of from 7 to 15 mm$^2$/s, more preferably of from 8 to 13 mm$^2$/s, even more preferably of from 9 to 12.5 mm$^2$/s and most preferably of from 10 to 12.5 mm$^2$/s. Preferred is a process as described herein, wherein the used oil has a lower kinematic viscosity than the cylinder oil.

One parameter determining the corrosion prevention properties of cylinder oils is the TBN value (also BN value or neutralization number). TBN is an abbreviation of "Total Base Number", which defines the chemical equivalent of KOH in milligrams to the amount of an acid necessary to neutralize the total base components included in 1 gram of a sample. For the purposes described herein the TBN values are determined as described in ASTM D 2896.

The TBN value of the cylinder oil produced by any of the processes of the present invention is preferably adapted to the sulfur content of the fuel used in the internal combustion engine according to known methods in the art. Background art in regard to this method is for example disclosed in US 2004/144355 A and references cited therein.

The cylinder oil produced by any of the processes described in the present application preferably has a TBN value of 10 or more, preferably 30 or more, more preferably of 50 or more and most preferably of 60 or more. The TBN value may also preferably be within one of the ranges 1 to 80, 1 to 30, 1 to 25, 1 to 10, 10 to 80, 10 to 60, 10 to 30, or 30 to 60. The used oil has typically a TBN value of 50 or less, more typically of 30 or less and usually of 15 or less. Preferably, the fresh cylinder oil used in this invention has a high TBN value and a high viscosity. Typically, the fresh cylinder oil used in the process of the present invention as described herein has a TBN value of 10 or more, preferably of 50 or more, more preferably of 80 or more, even more preferably of 90 or more and most preferably of 100 or more. It may also be preferable to use a fresh cylinder oil with a TBN value of 50 or less, of 40 or less or of 25 or less.

Blending of the used oil and the fresh cylinder oil may be effected by any means know to the person skilled in the art to blend oils, preferred is however blending in a static mixing duct, blending pipe or in-line blending unit. Useful static mixers that can be used for the present invention are for example described in U.S. Pat. No. 8,147,124. Alternatively, batch blending in a separate tank equipped with an agitator is also possible.

Preferred is further a process as described herein, wherein the used oil comprises one or more oils selected from the group consisting of used hydraulic fluids, used gear oils, used system oils, used trunk piston engine oils, used turbine oils, used heavy duty diesel oils, used compressor oils and mixtures thereof. Preferably, the used oil comprises used system oil. More preferably, the used oil consists of used system oil.

The cylinder oil produced by any of the processes described herein comprises typically at least 2% of used oil, preferably at least 5% of used oil, and more preferably at least 10% of used oil. It is even more preferred that the cylinder oil produced by any of the methods described herein comprises at least 20% of used oil and most preferred at least 30% of used oil. The cylinder oil produced by any of the processes described herein may comprise at least 40% of used oil or at least 50% of used oil. Preferably, the cylinder oil produced by any of the processes described herein comprises at most 60% of used oil, more preferably at most 50% of used oil, even more preferably at most 40% of used oil and most preferred at most 30% of used oil. The amount of used oil in the cylinder oil produced by any of the processes described herein is preferably in a range of from 10% to 50%, more preferably of from 20% to 40%.

The cylinder oil produced by any of the processes described herein comprises typically at least 1% of fresh cylinder oil, preferably at least 5% of fresh cylinder oil and more preferably at least 10% of fresh cylinder oil. The cylinder oil produced by any of the processes described herein may comprise at most 80% fresh cylinder oil or at least 50% used oil. Preferably, the cylinder oil produced by any of the processes described herein comprises at most 80% fresh cylinder oil, more preferably at most 60% fresh cylinder oil, even more preferably at most 40% fresh cylinder oil and most preferred at most 35% fresh cylinder oil. In the cylinder oil produced by any of the processes described herein, preferably the amount of used oil is at least 1% and/or the amount of fresh cylinder oil is at least 1%. More preferably the amount of used oil is at least 1% and/or the amount of fresh cylinder oil at least 5%. Even more preferably, the amount of used oil is at least 1% and/or the amount of fresh cylinder oil at least 10%.

Most preferably, the amount of used oil is at least 10% and/or the amount of fresh cylinder oil at least 10%. All amounts of used oil and fresh cylinder oil in the cylinder oil given herein are stated in percent by weight, based on the total amount of the cylinder oil produced in the process described herein, unless otherwise noted.

Also preferred is a process as described herein, especially as described herein as preferred, wherein the used oil is obtained from an apparatus on a ship. Ships use oil in various apparatus in large amounts. Disposal of the used oil is costly. Costs of disposal may therefore be avoided if the used oil can be reused as cylinder oil. Further preferred is a process as described herein, wherein the process is performed on a ship. Disposal of used oil is only possible in harbors and cost for storage facilities can be avoided if the used oil is directly consumed as cylinder oil without transport to a factory or the like, where cylinder oil could be produced from the used oil.

A further aspect of the present invention is a process for the operation of an internal combustion engine comprising the steps of:
preparing a cylinder oil according to any of the embodiments of the process for the production of a cylinder oil as described above, and
using the cylinder oil in the internal combustion engine.

Especially preferred is such a process where the internal combustion engine is a two-stroke crosshead engine. Further preferably, the internal combustion engine of the process may be a four-stroke engine, in particular an auxiliary engine installed on a ship.

Further preferred is such a process, wherein
the internal combustion engine is a two-stroke crosshead engine or a four-stroke engine,
the cylinder oil is used as an all-loss cylinder oil, and
the used oil comprises used system oil of the two-stroke crosshead engine or of the four-stroke engine respectively. In such a process, the used system oil of the two-stroke crosshead engine or of the four-stroke engine respectively may be used completely for the preparation of the cylinder oil according to the process of the present invention and costs for storage and disposal can be saved. The cylinder oil produced in such a process can be exactly adjusted for the TBN values needed for the fuel used and the viscosity of the cylinder oil produced is close to that of fresh cylinder oil. Further preferred are any of the processes for the operation of an internal combustion engine as described herein, wherein the two-stroke crosshead engine and/or the four-stroke engine respectively is installed on a ship.

Preferred is also any one of the processes for the operation of an internal combustion engine as described herein, wherein
the used oil is derived from at least one engine compartment or at least one storage compartment,
the used oil is blended with the fresh cylinder oil by means of a blending means, and
the cylinder oil is delivered to at least one cylinder of the internal combustion engine.

The used oil, the fresh cylinder oil and the cylinder oil of this process may be of any kind as described herein. In such a process the usual equipment used with an internal combustion engine, e.g. the oil sump and the cylinders are preferably connected to the blending means. Conventional internal combustion engines can therefore easily be retrofitted with this system without large expenses and with minimal additional equipment, i.e. piping, a blender and maybe pumps.

Further preferred is any one of the processes for the operation of an internal combustion engine as described herein, wherein the amount of used oil and cylinder oil blended is determined by the TBN value desired for the cylinder oil, the TBN value of the used oil and the TBN value of the fresh cylinder oil. This allows production of cylinder oil with an exactly determined TBN value and therefore its adjustment to the fuel used.

A further aspect of the present invention is an apparatus for the preparation of a cylinder oil, comprising a blending means for blending used oil and fresh cylinder oil, characterized in that the blending means is in flow communication with
- at least one compartment of an internal combustion engine designed to comprise used oil or at least one storage compartment designed for used oil,
- at least one storage compartment for fresh cylinder oil, and
- at least one cylinder of an internal combustion engine.

A compartment of an internal combustion engine designed to comprise used oil is a compartment of the internal combustion engine that in usual operation of the engine comprises used oil or may comprise used oil and can be used for the removal of used oil. A storage compartment for fresh cylinder oil is any storage compartment that can hold cylinder oil. Again, this apparatus makes full use of the equipment usually installed at an internal combustion engine that uses cylinder oil, for example, the oil sump or a compartment of the internal combustion engine and the storage tank for the fresh cylinder oil. Only a blending means, piping and possibly pumps have to be installed to prepare a usual installation for the operation of an internal combustion engine for the use with the process as described herein. The piping and tanks usually need no additional heating or equipment of any other kind.

Further preferred is an apparatus as described herein, comprising additionally
- a pump for the transport of used oil to the blending means,
- a pump for the transport of the fresh cylinder oil to the blending means, and
- at least one storage compartment for the prepared cylinder oil.

Also preferred is an apparatus as described herein, wherein the used oil comprises used system oil of the internal combustion engine. As described above, for the equivalent process, this apparatus allows the optimal use of the used system oil and the production of a cylinder oil that has exactly the required TBN-value and a kinematic viscosity that is closer to the desired value than that of the processes of the prior art. Most preferred is an apparatus as described herein, wherein the internal combustion engine is a two-stroke crosshead engine or a four-stroke engine, in particular a four-stroke auxiliary engine installed on a ship.

The apparatus according to the present invention may comprise additionally a system oil tank, which is connected by piping to the blending means. This allows the use of fresh system oil instead of or in addition to the used system oil.

A further aspect of the present invention is a ship comprising an apparatus as described herein.

A further aspect of the present invention is the use of used oil and fresh cylinder oil for the preparation of cylinder oil. The used oil and the fresh cylinder oil of the inventive use as well as the cylinder oil that results from the inventive use may be of any kind described herein.

The processes, apparatus and uses of the present invention are especially provided for the use with reciprocating internal combustion engines and most preferably with two-stroke crosshead engines and/or with four-stroke (auxiliary) engines. Most preferably, the engines are installed on a ship.

BRIEF DESCRIPTION OF THE DRAWINGS

FIG. 1 describes an example for an apparatus of the present invention.
FIG. 2 describes another example for an apparatus of the present invention.

DETAILED DESCRIPTION OF THE DRAWINGS

Figure 1:
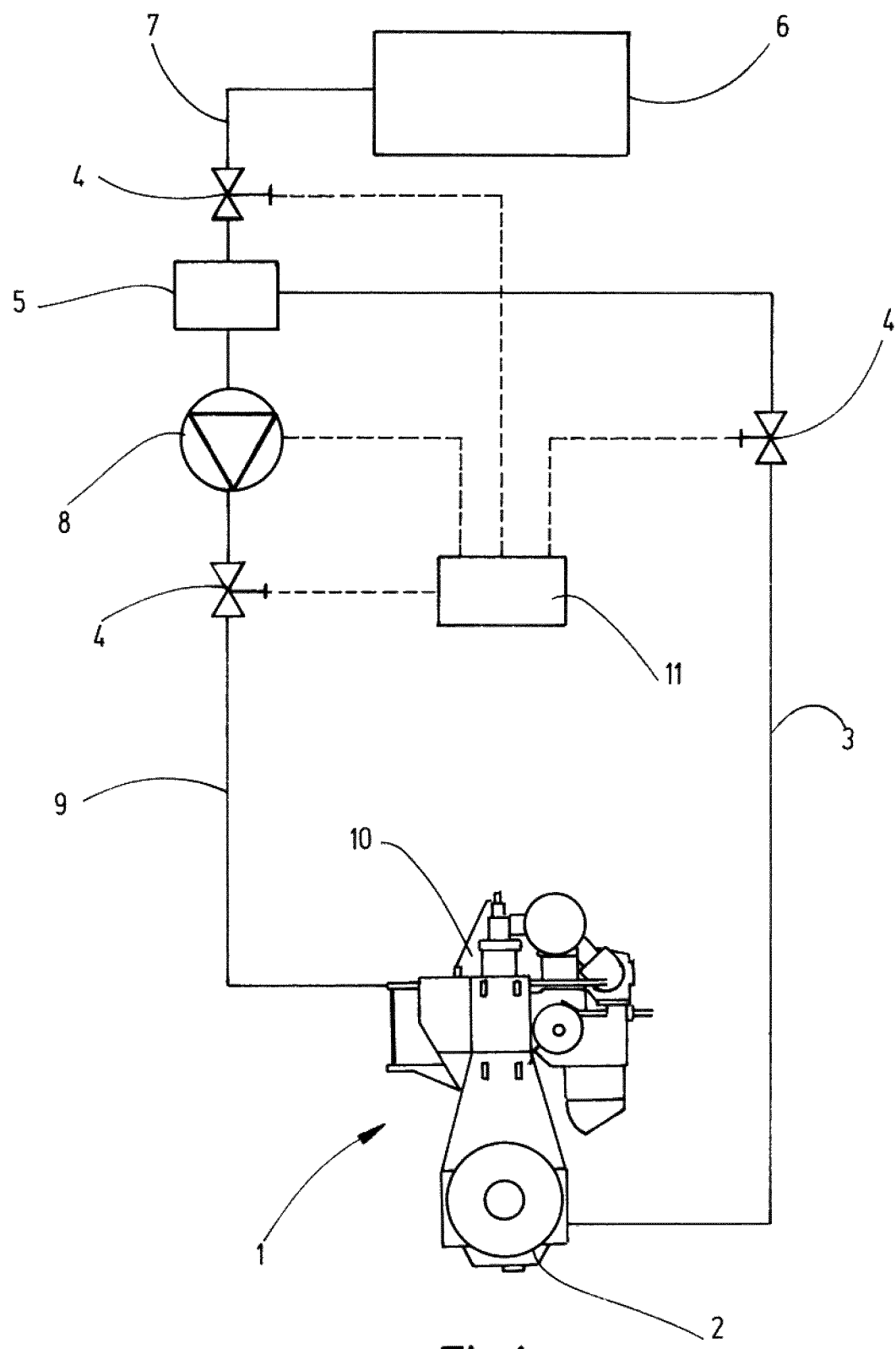
FIG. 1.

FIG. 1 shows an internal combustion engine 1 with an oil sump 2, which is connected via piping 3 with blending means 5. It further shows a fresh cylinder storage tank 6 connected via piping 7 with the blending means 5. The blending means is further connected via piping 9 to the cylinder oil injection openings in the cylinder 10 of internal combustion engine 1. Pipings 3, 7 and 9 each comprise a valve 4 and piping 9 further comprises a pump 8. The valves 4 and the pump 8 are connected to a controller 11.

In usual operation mode, the TBN value of the cylinder oil produced by the blending means 5 and flowing into piping 9 is measured by an instrument known in the art (not shown) and an electrical signal is submitted to the controller 11. The controller 11 uses the signal to determine the amount of system oil from the oil sump 2 and the amount of fresh cylinder oil from the fresh cylinder storage tank 6 that are needed to produce the cylinder oil with the TBN value required. The controller 11 controls the valves 4 and the pump 8 in order to provide the correct amount of cylinder oil with the correct TBN value to the oil injection openings in the cylinder 10 of internal combustion engine 1. For the case that a cylinder oil with very high TBN value is required for the operation of the internal combustion engine 1, controller 11 can be programmed such that 100% fresh cylinder oil is provided to the cylinder oil injection openings in the cylinder 10 of internal combustion engine 1.

Figure 2:
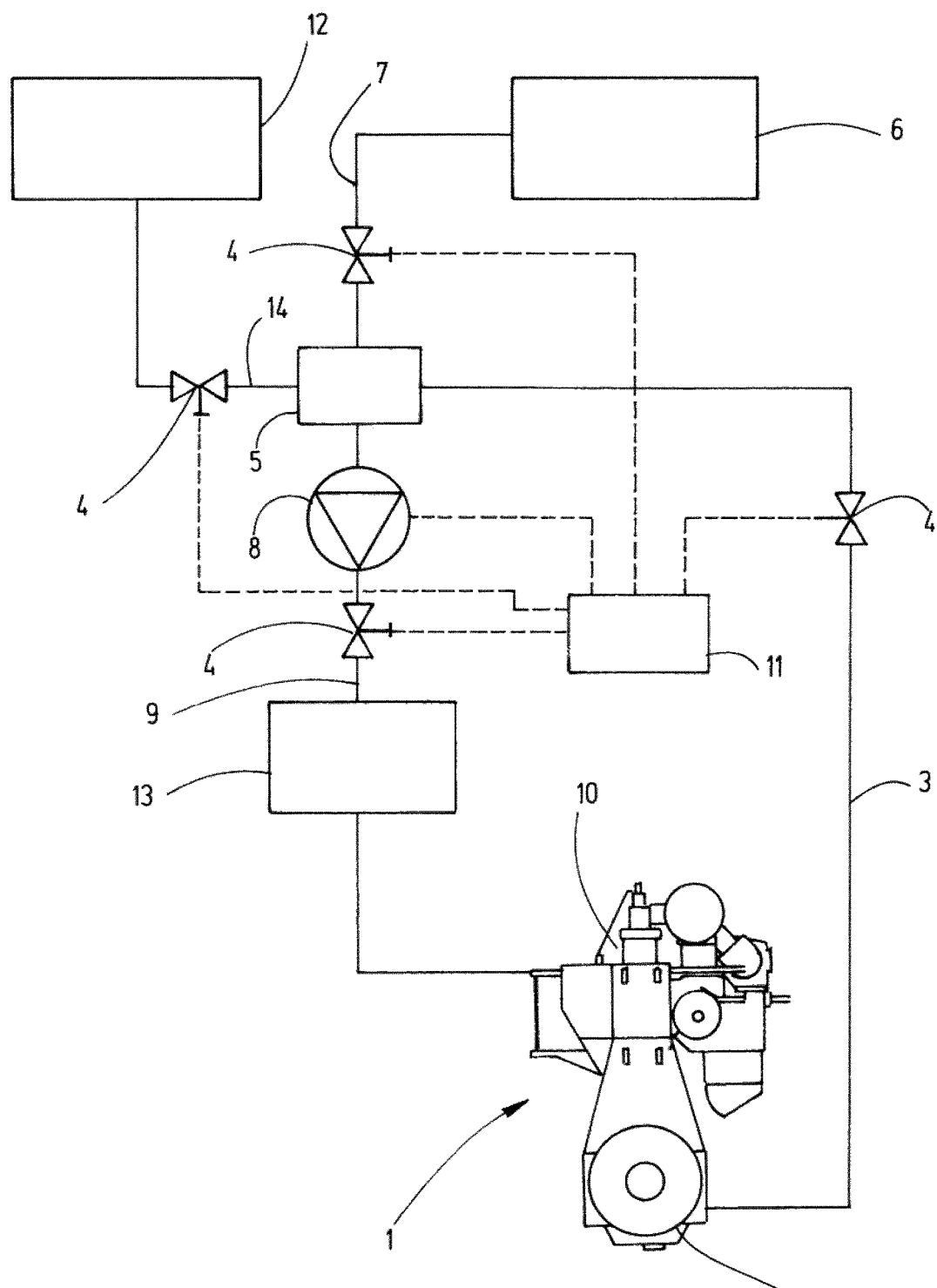
FIG. 2.

FIG. 2 depicts a similar embodiment of the present invention as FIG. 1. The embodiment of FIG. 2 has additionally a system oil tank 12, which is connected by piping 14, which comprises a further valve 4, to the blending means 5. This allows the use of fresh system oil instead or in addition to the used system oil from oil sump 2. The apparatus may also be fitted with additional piping and valves that would allow the controller 11 to replenish the system oil used or removed from oil sump 2. FIG. 2 further shows a cylinder oil tank 13 that can be used to buffer cylinder oil production and use.

EXAMPLE

The following example will show the advantages of the present invention in view of the prior art for a typical example of a cylinder oil. Table 1 shows for the commercially relevant TBN values 40 to 100 the amount of system oil that must be blended with the additives or with fresh cylinder oil, respectively, to arrive at the desired TBN value. Column 3 of table 1 concerning the additives is calculated in accordance with the system known from EP 1 640 442 B1. As fresh cylinder oil, NAVIGO 100 MCL™ (available from LUKOIL Marine Lubricants Ltd., Hamburg, Germany) with a kinematic viscosity of 20 mm²/s at 100° C. and a TBN value of 100 has been used. As system oil a commercially available system oil with a TBN value of 6 and a kinematic viscosity of 11.5 mm²/s at 100° C. has been used (i.e. NAVIGO 6 SO). As additive, a commercially available additive (i.e. Chevron OLOA 49805) with a TBN value of 320 and an apparent kinematic viscosity of 39 has been used. The measured kinematic viscosity of the additives is 101 mm²/s at 100° C. However, the additives are non-Newtonian fluids and the flow properties differ from those of Newtonian fluids when diluted with oils. In mixtures with system oil, the additive behaves as if it has a kinematic viscosity of 39 mm²/s at 100° C. The later value is therefore used for the calculation of the kinematic viscosity of the resulting cylinder oil.

The TBN value of the resulting cylinder oil is the weighted mean average values of the TBN values of the system oil and the fresh cylinder oil used. The values of the amount of system oil necessary to reach the desired TBN value has been calculated accordingly.

TABLE 1

TBN values of Mixtures of system oil with fresh cylinder oil or additives

| TBN | Fresh cylinder oil Weight percent system oil in the mixture | Additives Weight percent system oil in the mixture |
|---|---|---|
| 40 | 63.83% | 89.17% |
| 50 | 53.19% | 85.99% |
| 60 | 42.55% | 82.80% |
| 70 | 31.91% | 79.62% |
| 80 | 21.28% | 76.43% |
| 90 | 10.64% | 73.25% |
| 100 | 00.00% | 70.06% |

Figure 3:
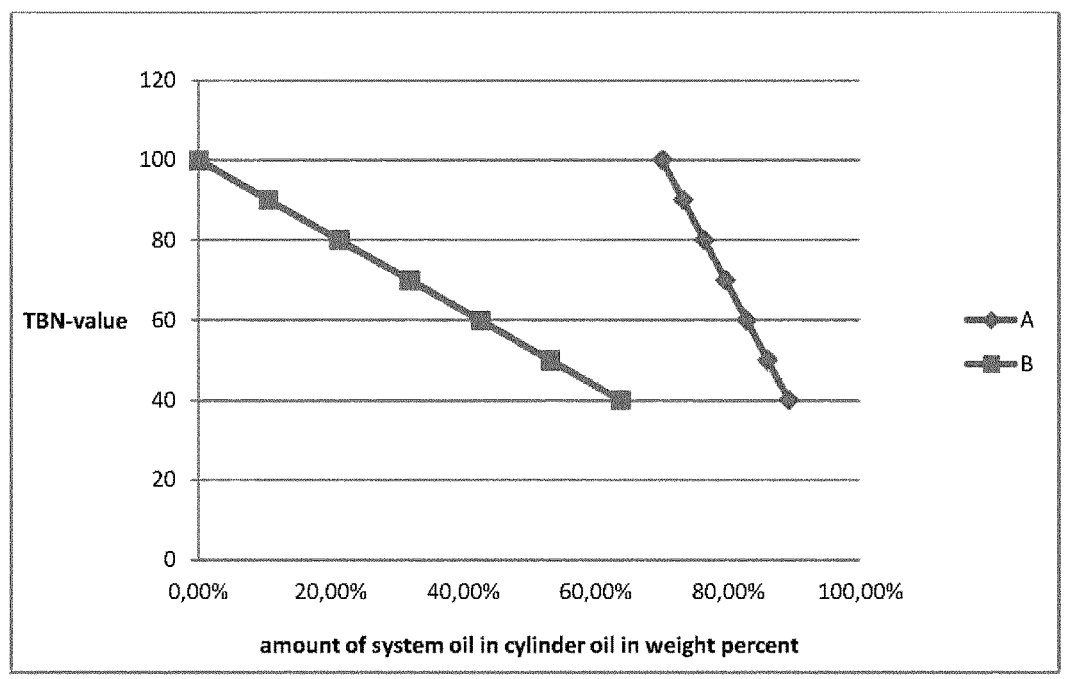
FIG. 3: The graph of FIG. 3 shows the TBN value as a function of the amount of system oil in the cylinder oil prepared according to the present invention (Graph B) and according to the method described in EP 1 640 442 B1 (Graph A).

FIG. 3 shows the same data as Table 1 as in the form of graphs, i.e. the TBN value as a function of the amount of system oil in the resulting cylinder oil. As can be seen, for any of the commercially useful TBN values, an amount of at least 70% system oil is necessary to arrive at the desired TBN value, if the cylinder oil is produced according to the prior art (Graph A). In contrast, according to the present invention (Graph B), an amount of 0% to about 64% system oil is necessary. For a MAN B&W two-stroke crosshead engine with a bore of 80 cm, when using a heavy fuel oil (HFO) with a sulfur content of 3% by weight, a cylinder oil with a TBN value of 70 and a kinematic viscosity of 17 is recommended at a feed rate of 0.6 g/kWh. For the desired TBN value of 70, about 30% cylinder oil is necessary according to the present invention and about 80% according to the prior art. For such an engine, the manufacturer recommends the continued renewal of a certain amount of system oil used in the engine in order to replenish the system oil and to remove used system oil. The use of about 30% of system oil in the cylinder oil would be in accordance with the amount of used system oil that needs to be withdrawn from the engine continuously. Therefore, the process according to the present invention uses about the same amount of used system oil that accumulates in the same time from the oil exchange in the engine. In contrast, the process according to EP 1 640 442 B1 uses more than twice that amount, resulting in the use of system oil that is almost unused, thereby resulting in waste.

As discussed, for the above-mentioned engine, a heavy fuel oil comprising 3% by weight sulfur, a TBN value of 70 and a viscosity of 17 are recommended. From the amount of system oil and fresh cylinder oil in the resulting cylinder oil and the viscosity data of the system oil and the fresh cylinder oil, the kinematic viscosity of the resulting cylinder oil can be calculated according to the equation of Ubbelohde-Walther (see DIN 51563). For the mixtures with a TBN value of 70, the viscosities are significantly lower than the recommended viscosity, namely 14.3 mm²/s at 100° C. for a mixture of system oil and additives and 16.6 mm²/s at 100° C. for a mixture of system oil with fresh cylinder oil. As can be seen, the cylinder oil produced according to the present invention has a kinematic viscosity that is almost identical to the target viscosity, i.e. 16.6 mm²/s at 100° C. as compared to the desired 17 mm²/s at 100° C. In contrast, the kinematic viscosity of the cylinder oil produced according to the prior art has a viscosity that is much lower than the target viscosity, i.e. 14.3 mm²/s at 100° C. as compared to 17 mm²/s at 100° C.

As discussed above, because the viscosity of the oil film is too low for the cylinder oil prepared according to the prior art, the oil film on the cylinder liner may not be continuous and the cylinder or the piston ring may come in direct contact with the cylinder liner leading to increased wear. Furthermore, as a consequence of the low oil film thickness the alkalinity reserve of the oil film covering the liner surface is too low, as less oil comprises less base compounds per surface area (which leads to a reduced alkalinity reserve), leading to a higher level of corrosive wear. This also results in a reduced alkalinity reserve. As a consequence, the feed rate for the cylinder oil has to be higher for the cylinder oil prepared according to the prior art. The present invention therefore reduces wear, corrosion and the amount of cylinder oil used and is therefore advantageous in the operation of internal combustion engines over the prior art.

LIST OF REFERENCE NUMERALS 1 internal combustion engine
2 oil sump
3 piping
4 valve
5 blending means
6 fresh cylinder storage tank
7 piping
8 pump
9 piping
10 cylinder of internal combustion engine
11 controller
12 system oil tank
13 cylinder oil tank
14 piping

The invention claimed is:

1. Process for the production of a cylinder oil comprising the steps:
    providing a used oil,
    providing a fresh cylinder oil from a fresh cylinder oil storage compartment, and
    blending the used oil with the fresh cylinder oil in a blending apparatus,
wherein the used oil has a lower TBN value than the fresh cylinder oil and wherein the cylinder oil and the fresh cylinder oil are all-loss cylinder oils for use in crosshead diesel engines and comprise alkaline additives.

2. Process according to claim 1, wherein the cylinder oil produced comprises at least 1% by weight used oil, based on the total amount of cylinder oil produced and/or at least 1% by weight of fresh cylinder oil, based on the total amount of cylinder oil produced.

3. Process according to claim 1, wherein the cylinder oil produced comprises at least 10% by weight used oil, based on the total amount of cylinder oil produced and/or at least 10% by weight of fresh cylinder oil, based on the total amount of cylinder oil produced.

4. Process according to claim 1, wherein the used oil has a lower kinematic viscosity than the cylinder oil.

5. Process according to claim 1, wherein the used oil comprises one or more oils selected from the group consisting of used hydraulic fluids, used gear oils, used system oils, used trunk piston engine oils, used turbine oils, used heavy duty diesel oils, used compressor oils and mixtures thereof.

6. Process according to claim 1, wherein the process is performed on a marine vessel.

7. Process according to claim 1, wherein the amount of used oil and cylinder oil blended is determined by the TBN value desired for the cylinder oil, the TBN value of the used oil and the TBN value of the fresh cylinder oil.

8. Process according to claim 1, wherein the fresh cylinder oil has a TBN value of 50 or more.

9. Process according to claim 1, wherein the fresh cylinder oil has a TBN value of 80 or more.

10. Process according to claim 1, wherein the fresh cylinder oil has a TBN value of 90 or more.

11. Process according to claim 1, wherein the fresh cylinder oil has a TBN value of 100 or more.

12. Process for the operation of an internal combustion engine comprising the steps of:
  preparing a cylinder oil using a process for the production of a cylinder oil, said process for the production of a cylinder oil comprising the steps:
    providing a used oil,
    providing a fresh cylinder oil from a fresh cylinder oil storage compartment, and
    blending the used oil with the fresh cylinder oil in a blending apparatus,
  wherein the used oil has a lower TBN value than the fresh cylinder oil and wherein the cylinder oil and the fresh cylinder oil are all-loss cylinder oils for the use in crosshead diesel engines and comprise alkaline additives; and
  using the cylinder oil in the internal combustion engine.

13. Process according to claim 12, wherein
  the internal combustion engine is a two-stroke crosshead engine, and
  the used oil comprises used system oil of the two-stroke crosshead engine.

14. Process according to claim 12, wherein the used oil is derived from at least one engine compartment or at least one storage compartment, the used oil is blended with the fresh cylinder oil by the blending apparatus, and the cylinder oil is delivered to at least one cylinder of the internal combustion engine.

15. Process according to claim 12, wherein the amount of used oil and fresh cylinder oil blended is determined by the TBN value desired for the cylinder oil, the TBN value of the used oil and the TBN value of the fresh cylinder oil.

16. Process according to claim 12, wherein the fresh cylinder oil has a TBN value of 50 or more.

17. Apparatus for the preparation of a cylinder oil, comprising
  a blending apparatus operable to blend used oil and fresh cylinder oil,
  an internal combustion engine comprising at least one cylinder,
  at least one compartment of the internal combustion engine that comprises used oil or at least one storage compartment comprising used oil, and
  at least one fresh cylinder oil storage compartment containing fresh cylinder oil,
wherein the blending apparatus is in flow communication with
  the at least one compartment of the internal combustion engine that comprises used oil or at least one storage compartment comprising used oil,
  the at least one fresh cylinder oil storage compartment containing fresh cylinder oil, and
  at least one cylinder of an internal combustion engine,
wherein the internal combustion engine is a two-stroke crosshead engine, and
wherein the cylinder oil and the fresh cylinder oil are all-loss cylinder oils for the use in crosshead diesel engines and comprise alkaline additives.

18. Apparatus according to claim 17, comprising additionally
  a pump for the transport of used oil to the blending apparatus,
  a pump for the transport of the fresh cylinder oil to the blending apparatus, and
  at least one storage compartment for the prepared cylinder oil.

19. Apparatus according to claim 17, wherein the fresh cylinder oil has a TBN value of 50 or more.

20. Ship comprising an apparatus for the preparation of a cylinder oil, comprising
  a blending apparatus operable to blend used oil and fresh cylinder oil,
  an internal combustion engine comprising at least one cylinder,
  at least one compartment of the internal combustion engine that comprises used oil or at least one storage compartment comprising used oil, and
  at least one fresh cylinder oil storage compartment containing fresh cylinder oil,
wherein the blending apparatus is in flow communication with
  the at least one compartment of the internal combustion engine that comprises used oil or at least one storage compartment comprising used oil,
  the at least one storage compartment for fresh cylinder oil, and
  at least one cylinder of an internal combustion engine,
wherein the internal combustion engine is a two-stroke crosshead engine, and
wherein the cylinder oil and the fresh cylinder oil are all-loss cylinder oils for the use in crosshead diesel engines and comprise alkaline additives.

* * * * *

UNITED STATES PATENT AND TRADEMARK OFFICE
CERTIFICATE OF CORRECTION

PATENT NO. : 10,240,497 B2  
APPLICATION NO. : 14/768333  
DATED : March 26, 2019  
INVENTOR(S) : Stefan Claussen et al.

Page 1 of 1

It is certified that error appears in the above-identified patent and that said Letters Patent is hereby corrected as shown below:

On the Title Page

Item [30], change "13155770" to --13155770.4--.

Signed and Sealed this
Fourteenth Day of May, 2019

Andrei Iancu
*Director of the United States Patent and Trademark Office*